(12) United States Patent
Chen

(10) Patent No.: US 7,484,791 B1
(45) Date of Patent: Feb. 3, 2009

(54) AIR-GUIDING ASSEMBLY FOR REDUCING WIND DRAG

(76) Inventor: Shih H Chen, No.1-57, Zhonghua Rd., Yongkang City, Tainan County 710 (TW)

( * ) Notice: Subject to any disclaimer, the term of this patent is extended or adjusted under 35 U.S.C. 154(b) by 0 days.

(21) Appl. No.: 11/870,566

(22) Filed: Oct. 11, 2007

(51) Int. Cl.
*B60J 1/20* (2006.01)
*B60J 9/04* (2006.01)

(52) U.S. Cl. .................................................. 296/180.5
(58) Field of Classification Search .... 296/180.1–180.5
See application file for complete search history.

(56) References Cited

U.S. PATENT DOCUMENTS 7,226,117 B2 * 6/2007 Preiss ...................... 296/180.1

2002/0167196 A1 * 11/2002 Huang ...................... 296/180.5

* cited by examiner

*Primary Examiner*—H Gutman

(57) ABSTRACT

An air-guiding assembly for reducing the wind drag is provided at a tail end of a vehicle body and has a hollow frame. The frame is constituted of a plurality of air-guiding plates. These air-guiding plates are each formed into a curved shape. An airflow path is formed between the air-guiding plates. The front end surface of the frame is formed with an intake port, and the rear end surface thereof is formed with an exhaust port. The intake port and the exhaust port are in fluid communication with the airflow path. The area of the intake port is larger than that of the exhaust port, so that the exhaust port acts as a nozzle. When the airflow generated in driving is compulsively guided into the intake port of the frame to pass through the airflow path and then is guided out via the exhaust port, an invisible wind wall is formed in the rear of the vehicle, thereby reducing a whirlwind region in the rear of the vehicle. Therefore, the airflow is smoother and thus the driving efficiency is improved.

10 Claims, 12 Drawing Sheets

AIR-GUIDING ASSEMBLY FOR REDUCING WIND DRAG

BACKGROUND OF THE INVENTION

1. Field of the Invention

The present invention relates to an air-guiding assembly, and in particular to an air-guiding assembly for reducing the wind drag.

2. Description of Prior Art

The driving efficiency of a common vehicle will be affected due to the wind drag generated by the airflow. The most common solution is to mount an air-guiding plate. In addition to small cars, large-sized vehicles that travel for a long distance especially need the air-guiding plate. Although the weight of the large-sized vehicle is much larger than that of the small car, any kind of cars or vehicles will consume the fuel inevitably due to the wind drag when driving at a high speed. The only difference lies in that the air-guiding plate is mounted on the top of the head of the large-sized vehicle in prior art and the air-guiding plate is arranged obliquely on the top of the vehicle head. With the oblique air-guiding plate, the flowing angle of the incoming airflow can be changed when driving, thereby reducing the influence of the wind drag generated in driving at a high speed.

The air-guiding plate provided on the top of the vehicle head can change the direction of airflow to reduce the influence of the wind drag on the vehicle. However, in addition to the wind drag generated in the front end of the vehicle, the airflow passing through the vehicle body also generates a field of turbulent flow at the rear end of the vehicle body, which also affecting the driving efficiency directly.

As shown in FIG. 1, in the conventional air-guiding assembly for a vehicle, inclined plates 20 are provided respectively at upper and lower ends of the rear portion of the vehicle body 10, thereby changing the angle of the airflow generated in the rear of the vehicle body 10. In this way, the airflow generated will be smoother to reduce the generation of eddies, improving the low pressure in the rear of the vehicle body 10 and reducing the resistance in driving. However, in the above-mentioned prior art, since the volume of the inclined plates 20 should be large enough to support the strength of the airflow generated in driving at a high speed, which increasing the structure cost greatly. Further, the inclined plates 20 are located at the positions that may affect the opening and closing of the doors in the rear of the vehicle body 10, which is very inconvenient in use. Therefore, it is an import issue for those skilled in this art to solve the drawbacks of the above-mentioned prior art.

SUMMARY OF THE INVENTION

In view of the above drawbacks, the present invention is to provide an air-guiding assembly for reducing the wind drag, in which a frame is provided at a tail end of a vehicle body to guide the airflow generated in driving, thereby changing the direction of the airflow and reducing substantially the wind drag generated in driving. Via this arrangement, the driving efficiency and the stability of driving of a large-sized vehicle can be improved.

The present invention is to provide an air-guiding assembly for reducing the wind drag, which is provided at a tail end of a vehicle body and has a hollow frame. The frame is constituted of a plurality of air-guiding plates. These air-guiding plates are each formed into a curved shape. An airflow path is formed between the air-guiding plates. The front end surface of the frame is formed with an intake port, and the rear end surface thereof is formed with an exhaust port. The intake port and the exhaust port are in fluid communication with the airflow path. The area of the intake port is larger than that of the exhaust port, so that the exhaust port acts as a nozzle. When the airflow generated in driving is compulsively guided into the intake port of the frame to pass through the airflow path and then is guided out via the exhaust port, an invisible wind wall is formed in the rear of the vehicle, thereby reducing a whirlwind region in the rear of the vehicle. Therefore, the airflow is smoother and thus the driving efficiency is improved.

DETAILED DESCRIPTION OF THE INVENTION

The detailed description and the technical contents of the present invention will be explained with reference to the accompanying drawings.

Figure 1:
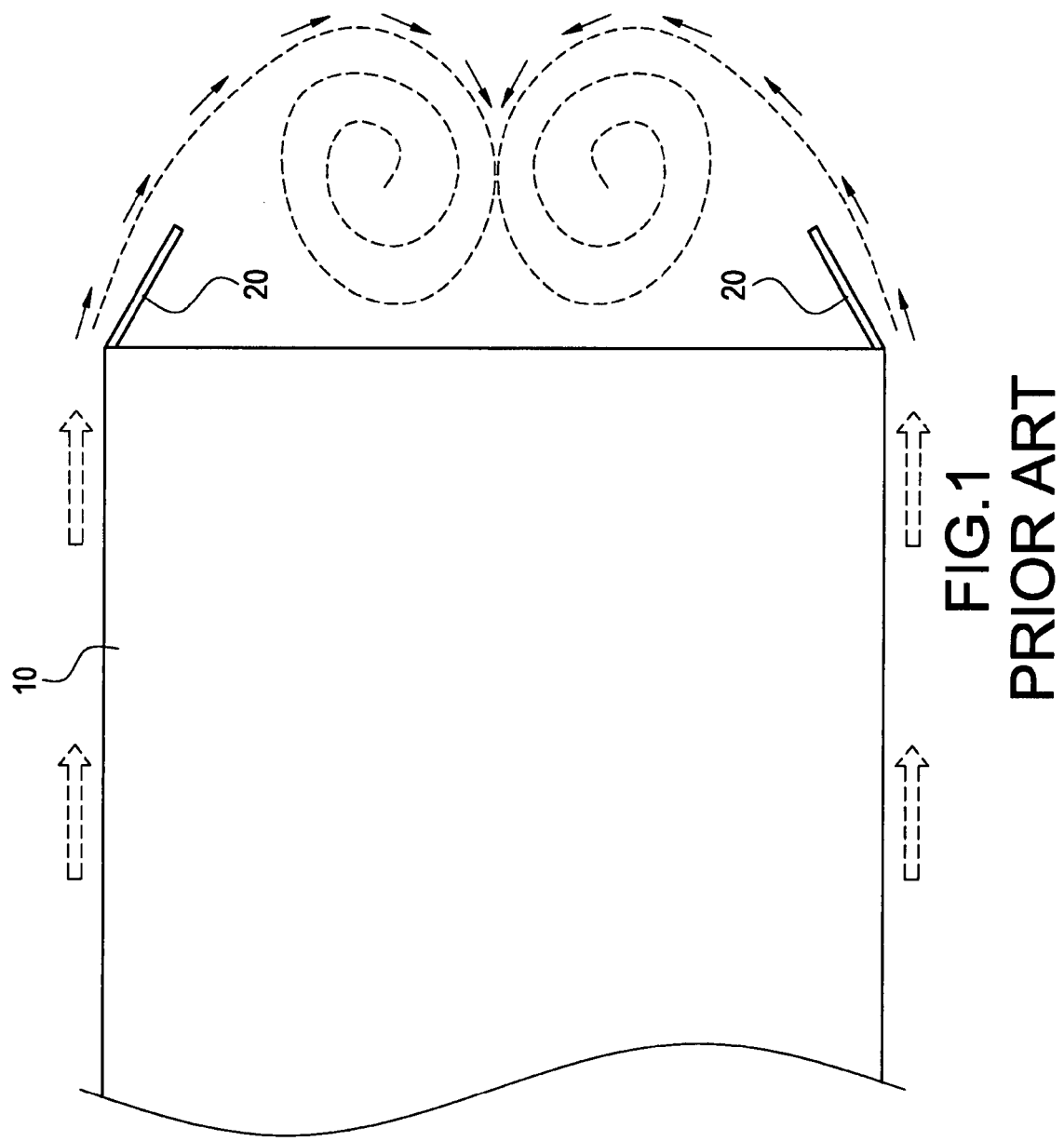
FIG. 1 is a schematic view showing the structure of a conventional air-guiding structure.
Figure 2:
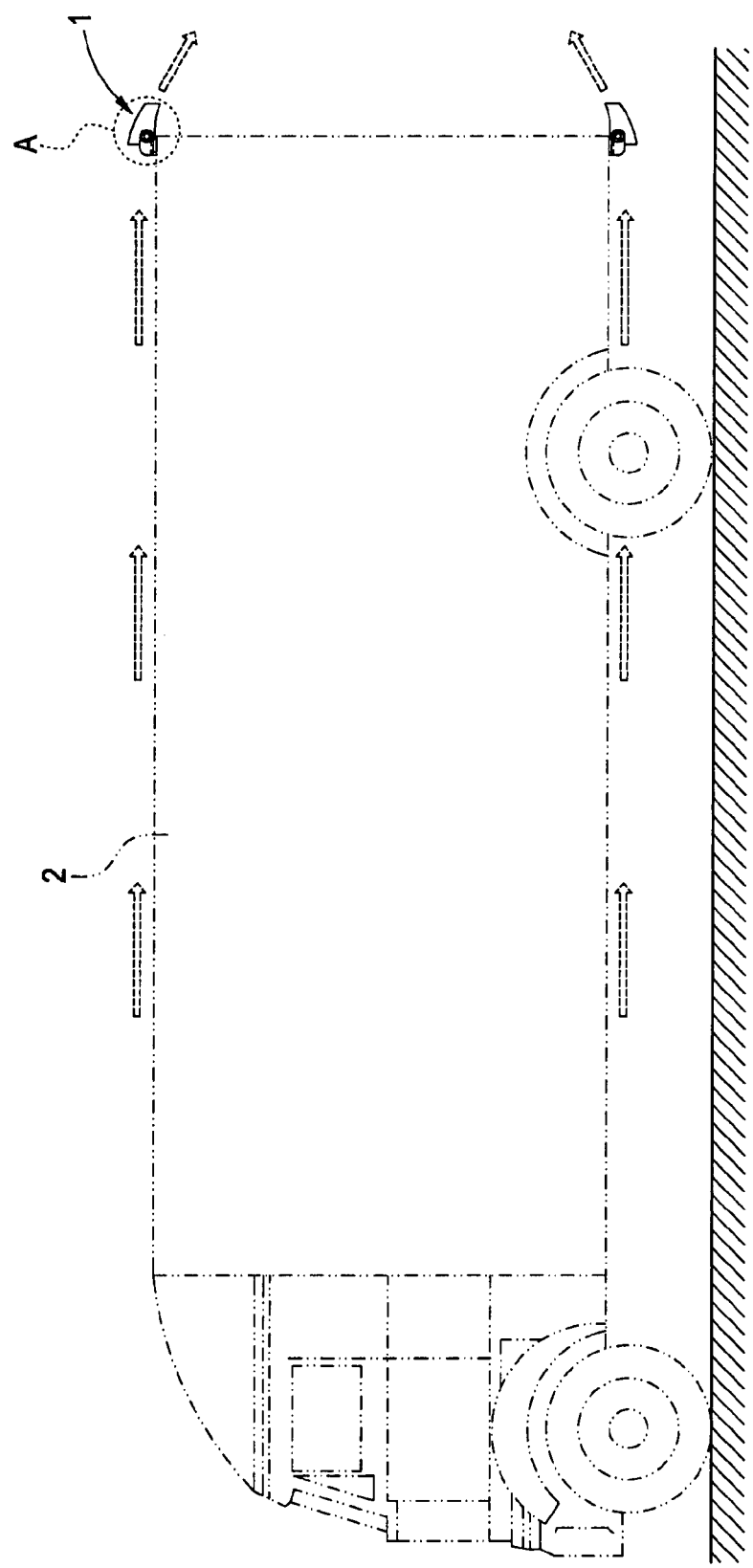
FIG. 2 is a schematic view showing the application of the present invention.
Figure 3:
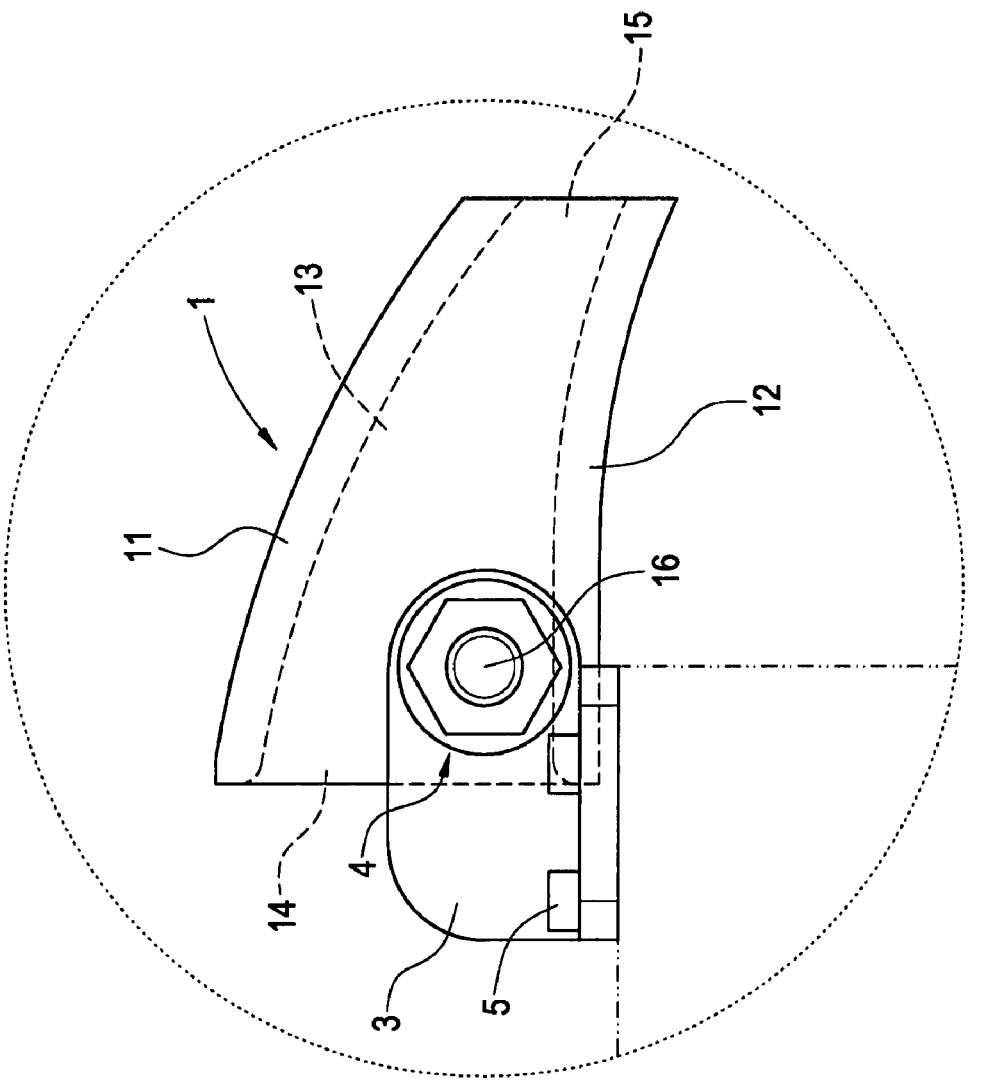
FIG. 3 is a partially enlarged view showing the region A in FIG. 2.
Figure 4:
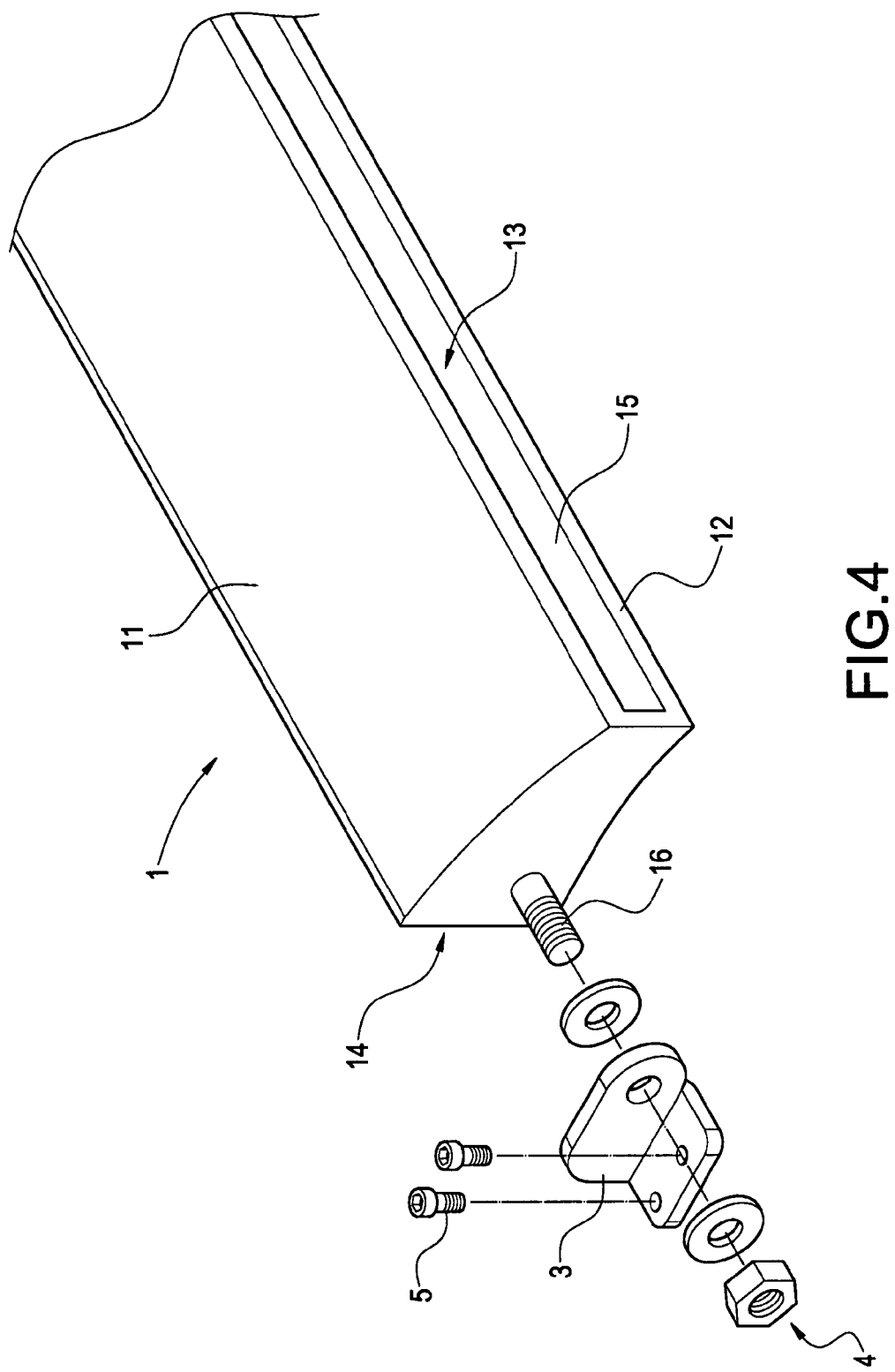
FIG. 4 is an exploded perspective view of the present invention.
Figure 5:
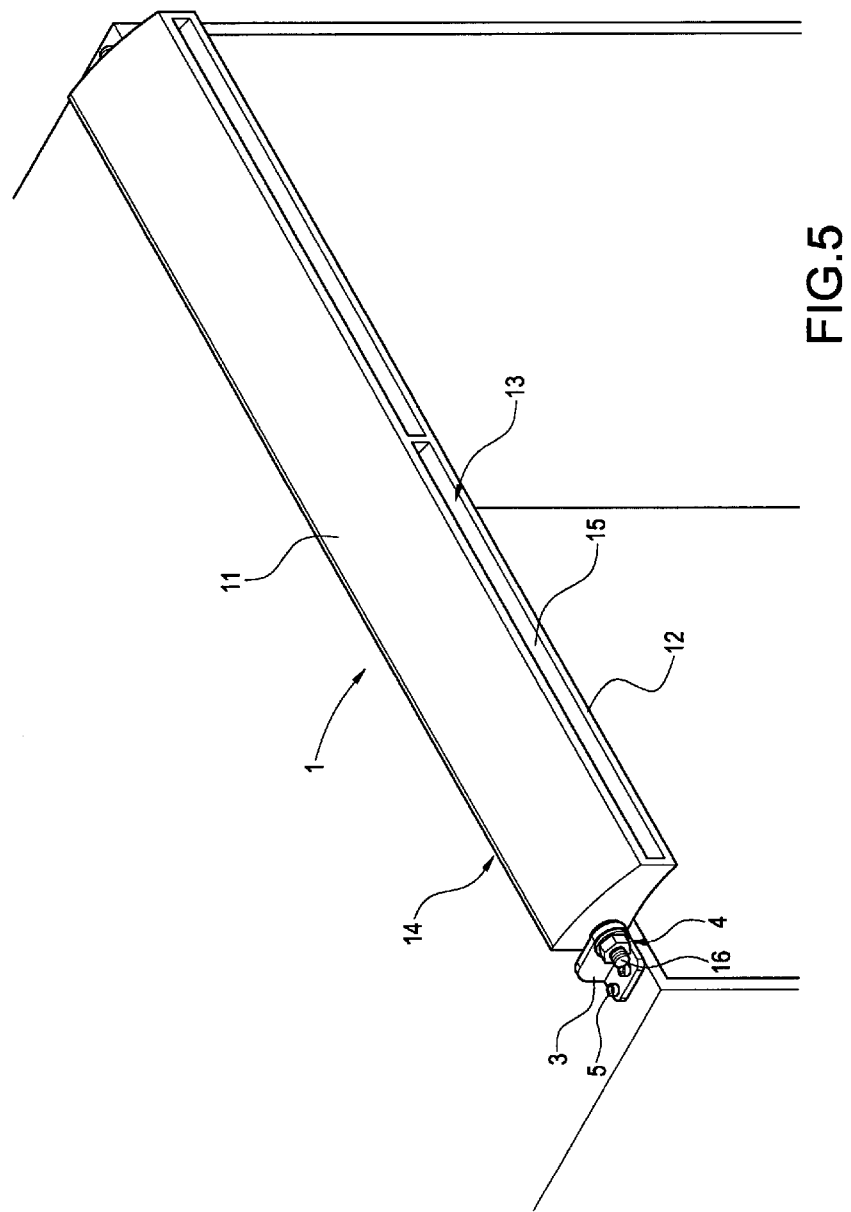
FIG. 5 is a schematic view showing that the present invention is assembled on a vehicle body.

With reference to FIGS. 2 to 5, the air-guiding assembly of the present invention is mounted on the top end of a tail portion of a large-sized vehicle (shown as a big truck in the drawings), as shown in the partially enlarged view of FIG. 2. With reference to FIG. 3, the air-guiding assembly is primarily constituted of a rectangular frame 1. The frame 1 is hollow and the upper and lower ends thereof are provided with an air-guiding plate 11 and 12 respectively. An airflow path 13 is formed between the air-guiding plates 11 and 12. The surfaces of the air-guiding plates 11 and 12 are each formed into a curved shape. The front end surface of the frame 1 has an intake port, and the rear end face thereof has an exhaust port 15. The area of the intake port 14 is larger than that of the exhaust port 15, so that the exhaust port 15 substantially acts as a nozzle. Further, in the present embodiment, the upper and lower air-guiding plates 11, 12 are integrally formed. Further, the left and right ends of the frame are provided with an extending-outwardly pivotal shaft 16 respectively. Those pivotal shafts 16 penetrate through a fixing base respectively. The pivotal shaft 16 and the fixing base 3 are connected to each other via a locking element 4, so that the frame 1 can rotate with respect to the fixing base 3. The fixing base 3 is fixed to the tail end of the vehicle body 2 via screws 5. The complete assembly of the present invention is shown in FIG. 5.

Figure 6:
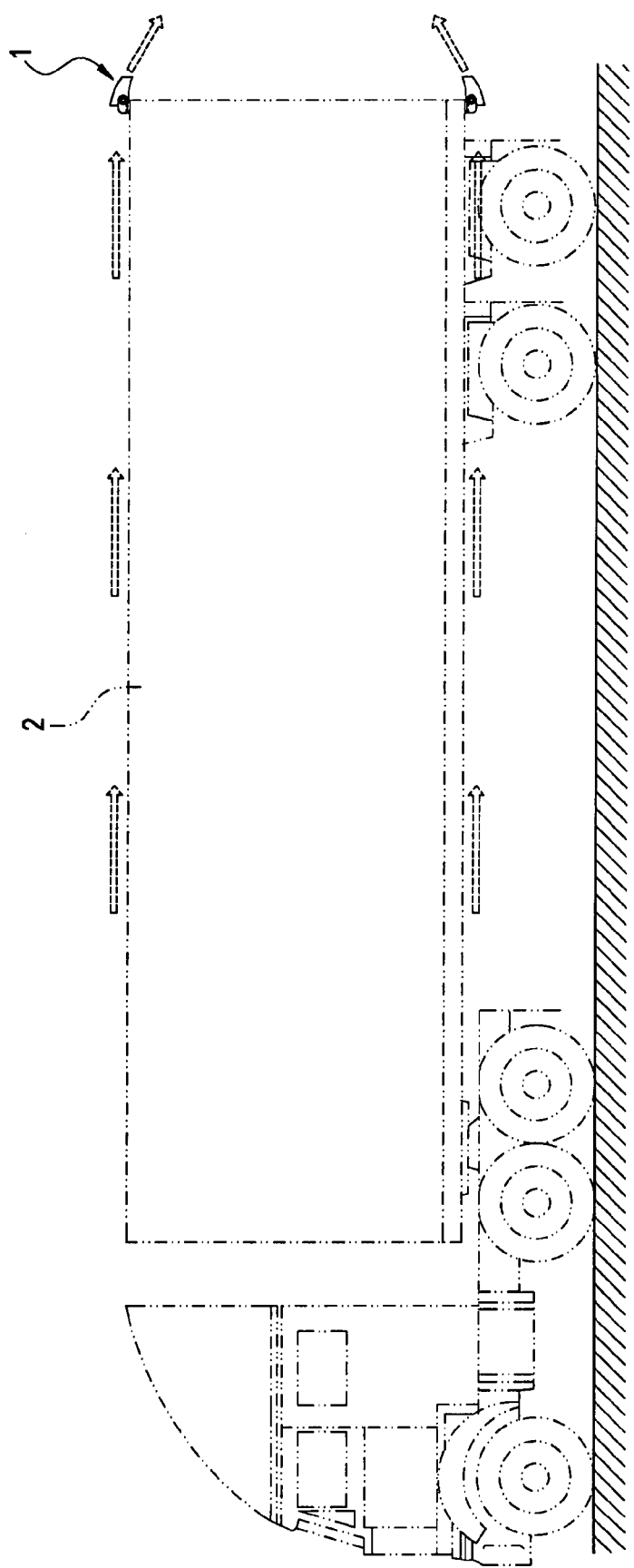
FIG. 6 is a schematic view showing an operating state of the present invention.
Figure 7:
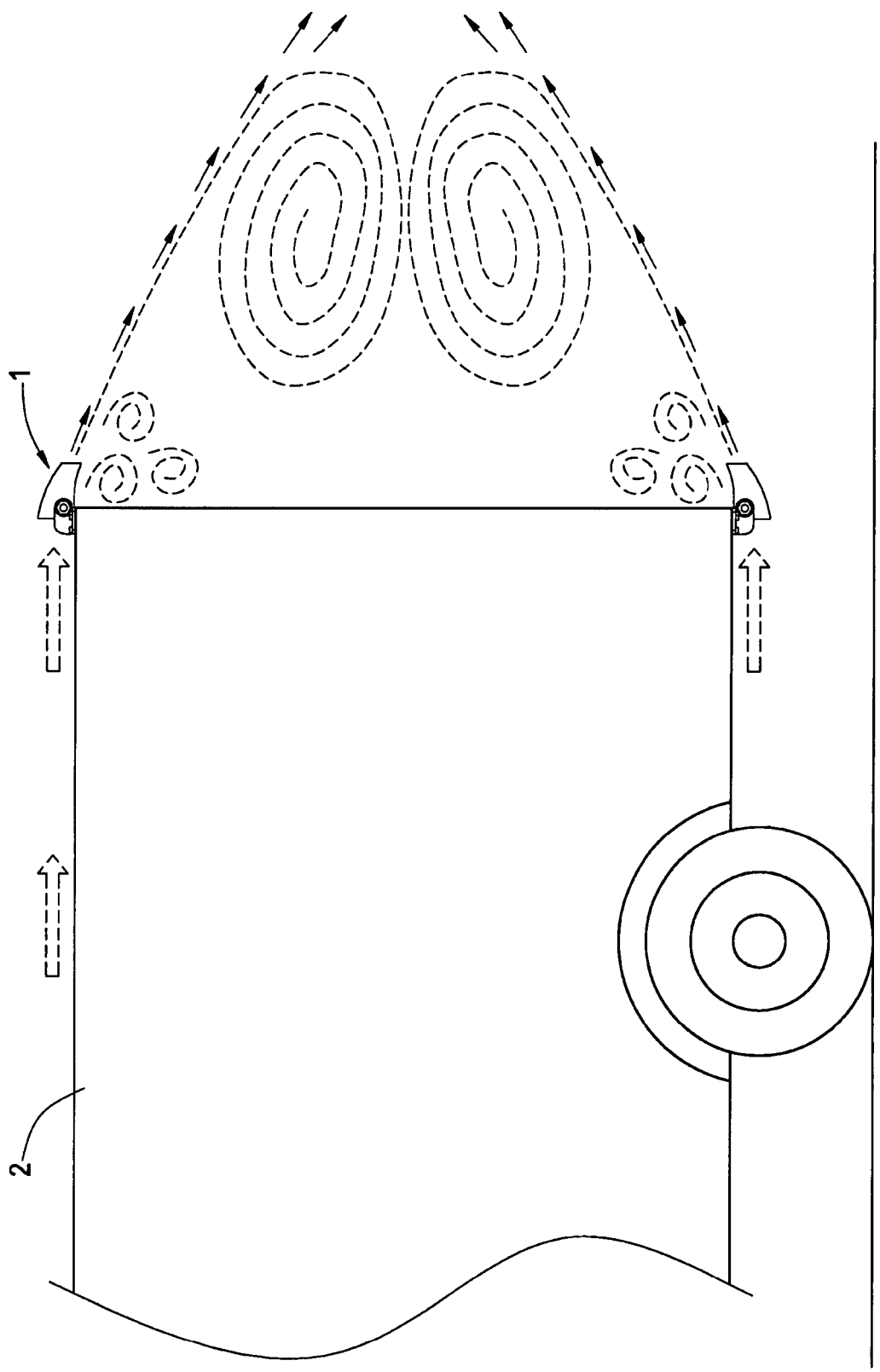
FIG. 7 is a partially enlarged view of FIG. 6.
Figure 8:
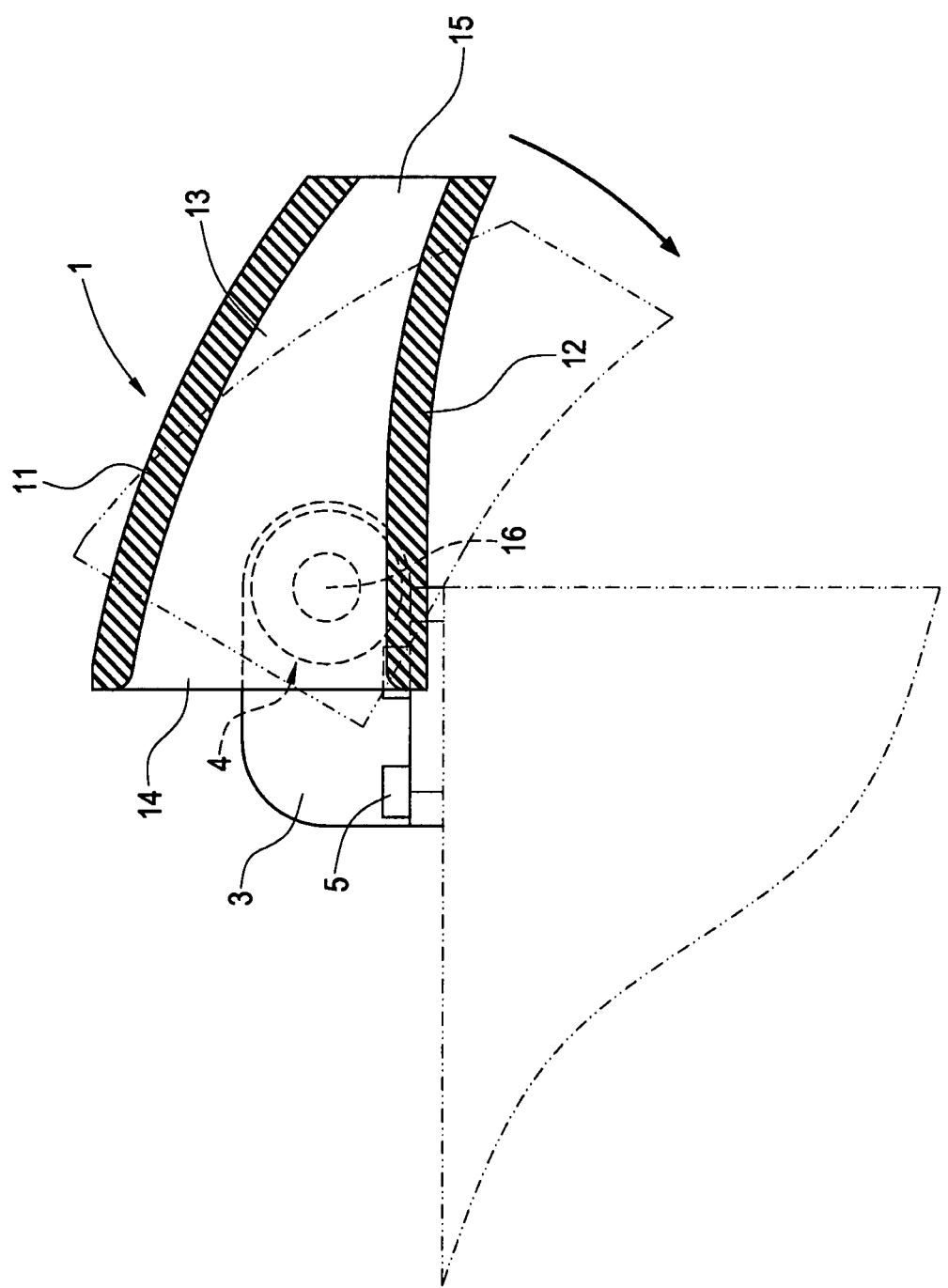
FIG. 8 is a schematic view showing a swinging action of the air-guiding assembly of the present invention.

With reference to FIGS. 6 to 8, the frame 1 of the air-guiding assembly of the present invention is provided on the tail end of the vehicle body 2. In the figures of the present embodiment, it can be seen that the upper and lower sides of tail end of the vehicle body 2 are provided with a frame body 1 respectively, so that the airflow generated in driving can flow along the outer periphery of the vehicle body 2 (indicated by arrows). When the airflow flows to the tail end of the vehicle body, it enters the intake port 14 at the front end surface of the frame 1 and exits the exhaust port 15 along the air-guiding direction of the airflow path 13 within the frame 1, thereby forming an invisible wind wall in the rear of the vehicle body 2. In this way, the whirlwind region in the rear of the vehicle body 2 can be reduced, so that the airflow is smoother (as shown in the airflow view of FIG. 6) to reduce the influence of the wind drag generated by the airflow. Therefore, the driving efficiency of driving can be improved. Further, as shown in FIG. 8, the air-guiding direction of the air-guiding assembly can be rotated upward and down according to the demands of driving and the wind conditions.

Figure 9:
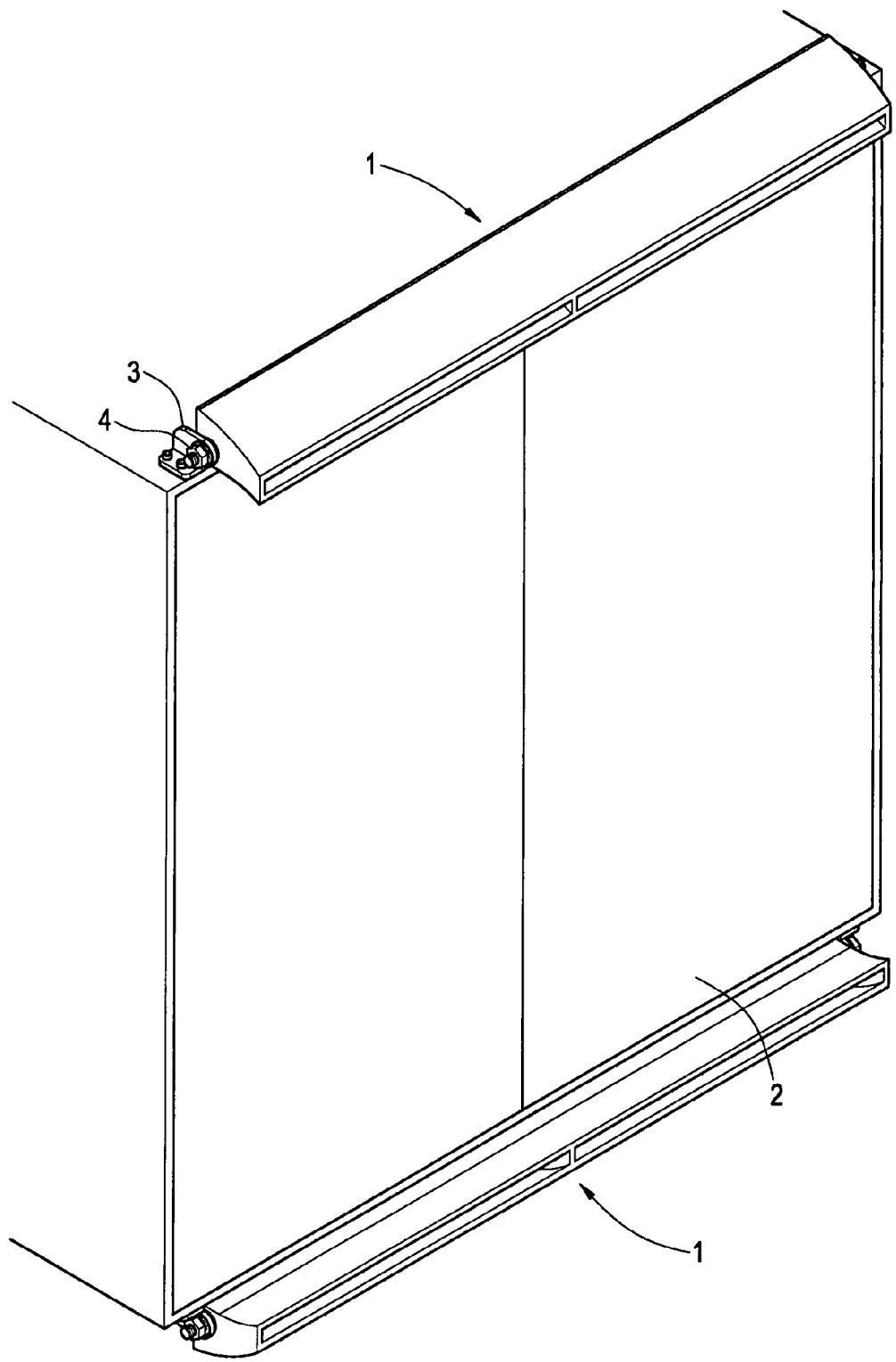
FIG. 9 is a schematic view (I) showing the arrangement of the air-guiding assembly of the present invention.
Figure 10:
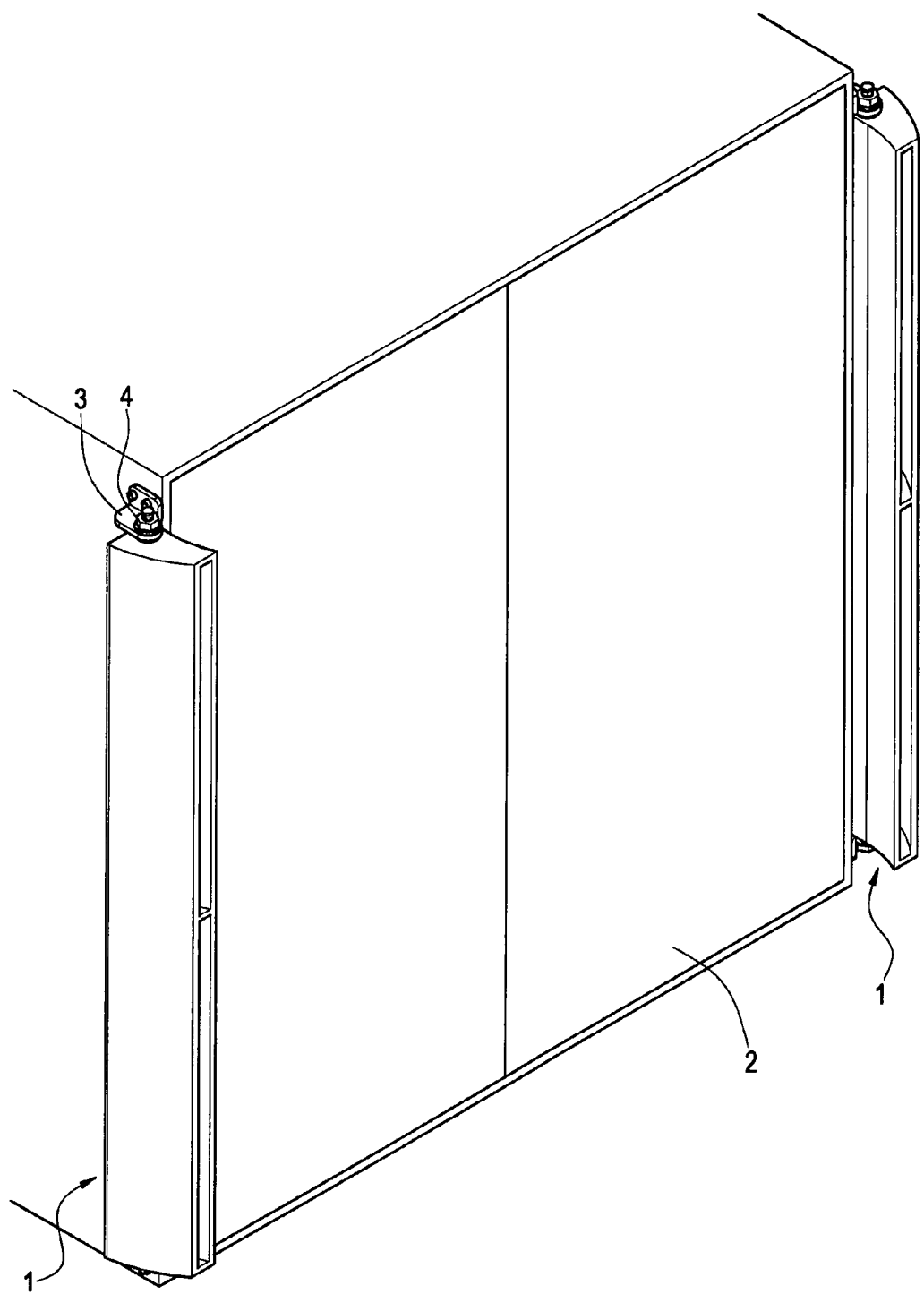
FIG. 10 is a schematic view (II) showing the arrangement of the air-guiding assembly of the present invention.
Figure 11:
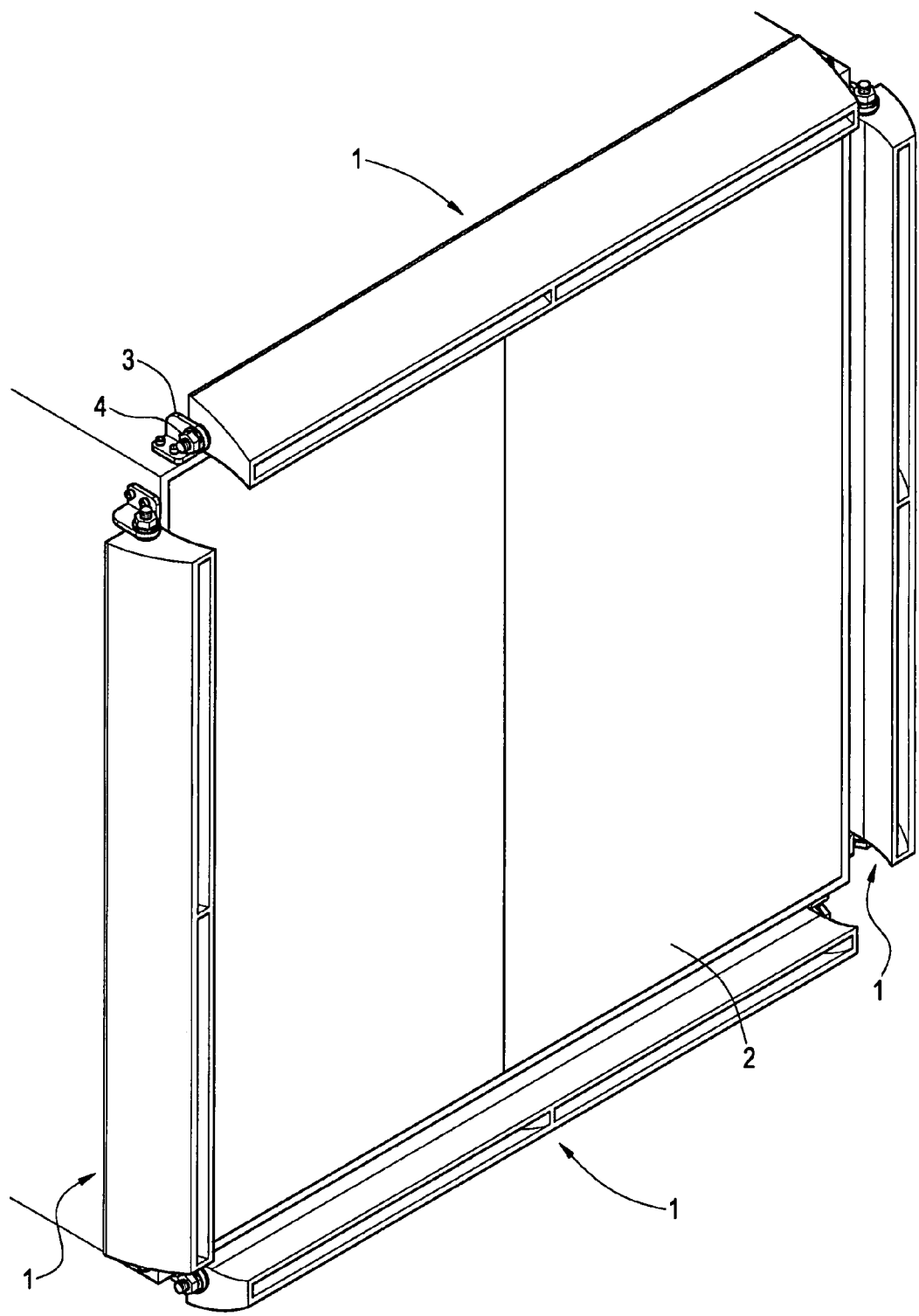
FIG. 11 is a schematic view (III) showing the arrangement of the air-guiding assembly of the present invention.

Please refer to FIGS. 9 to 11. As shown in FIG. 9, the position of the air-guiding assembly can be changed according to the different demands and the driving conditions. For example, the air-guiding assembly can be provided on the upper and lower sides of the tail end of the vehicle body 2. Alternatively, as shown in FIG. 10, the air-guiding assembly can be provided on the left and right sides of the tail end of the vehicle body 2. Also, as shown in FIG. 11, the air-guiding assembly can be provided on the upper, lower, left and right sides of the tail end of the vehicle body 2, thereby reduce the wind drag generated in each direction.

Figure 12:
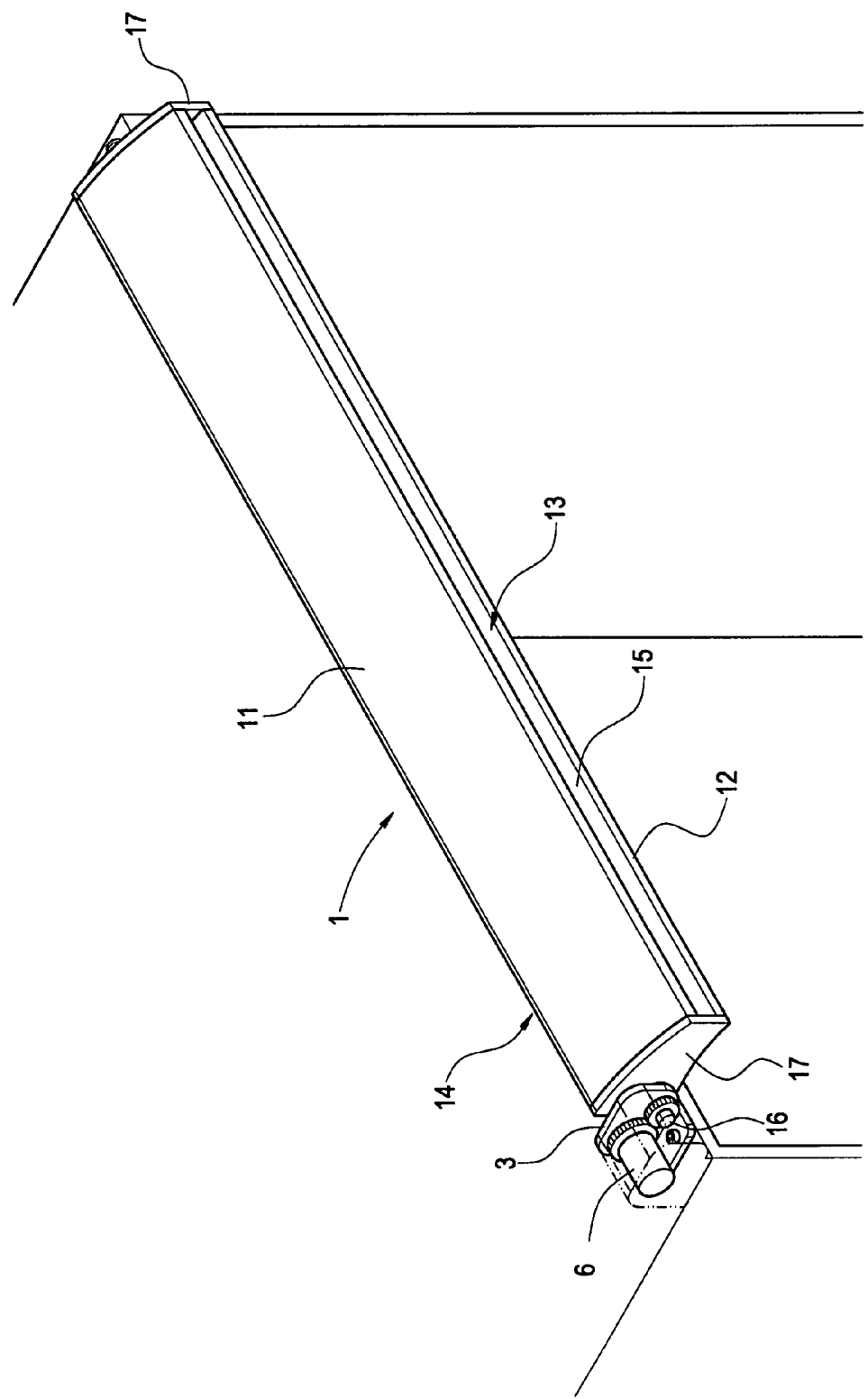
FIG. 12 is a schematic view showing the structure of another embodiment of the present invention.

Please refer to FIG. 12. The air-guiding assembly of the present invention is formed integrally with the frame 1, in addition, the frame 1 can be formed by means of combining a plurality of air-guiding plates 11, 12 and fixing plates 17 on left and right sides, thereby constituting the frame 1 of the air-guiding assembly. Further, an airflow path 13 is formed between the air-guiding plates 11 and 12. The fixing plates 17 on the left and right sides are provided thereon with a pivotal shaft 16 respectively. These pivotal shafts 16 penetrate through a fixing base 3 respectively. The pivotal shaft and the fixing base are fixed to the tail end of the vehicle body 2 collectively. The fixing base 3 is provided with a driving motor 6 that is brought into transmission with the pivotal shaft 16. Via the driving of the motor 6, the rotating and swinging direction of the frame 1 can be adjusted.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An air-guiding assembly for reducing the wind drag, provided at a tail end of a vehicle body and having a frame constituted of a plurality of air-guiding plates, each air-guiding plate being formed into a curved shape, an airflow path being formed between the air-guiding plates, an end of the frame having an intake port, and the other end thereof having an exhaust port, the intake port and the exhaust port being in fluid communication with the airflow path, the cross sectional area of the intake port being larger than that of the exhaust port, and the exhaust port of the airflow path facing inwardly toward the vehicle body.

2. The air-guiding assembly for reducing the wind drag according to claim 1, wherein both sides of the frame are provided with a pivotal shaft respectively, the air-guiding assembly further includes a fixing base, the pivotal shaft is pivoted on the fixing base for connecting to the tail end of the vehicle body.

3. The air-guiding assembly for reducing the wind drag according to claim 2, wherein the fixing base is further provided with a motor that is brought into transmission with the pivotal shaft.

4. The air-guiding assembly for reducing the wind drag according to claim 1, wherein the frame is integrally formed.

5. The air-guiding assembly for reducing the wind drag according to claim 1, wherein the frame further includes a plurality of fixing plates combined with the air-guiding plates to constitute the frame.

6. An air-guiding assembly for reducing the wind drag, comprising:
   a vehicle body; and
   a frame provided at a tail end of the vehicle body and constituted of a plurality of air-guiding plates, each air-guiding plate being formed into a curved shape, an airflow path being formed between the air-guiding plates, an end of the frame having an intake port, the other end thereof having an exhaust port, the intake port and the exhaust port being in fluid communication with the airflow path, and the cross sectional area of the intake port being larger than that of the exhaust port, and the exhaust sort of the airflow oath facing inwardly toward the vehicle body.

7. The air-guiding assembly for reducing the wind drag according to claim 6, wherein both sides of the frame are provided with a pivotal shaft respectively, the air-guiding assembly further includes a fixing base, the pivotal shaft is pivoted on the fixing base for connecting to the tail end of the vehicle body.

8. The air-guiding assembly for reducing the wind drag according to claim 7, wherein the fixing base is further provided with a motor that is brought into transmission with the pivotal shaft.

9. The air-guiding assembly for reducing the wind drag according to claim 6, wherein the frame is integrally formed.

10. The air-guiding assembly for reducing the wind drag according to claim 6, wherein the frame further includes a plurality of fixing plates combined with the air-guiding plates to constitute the frame.

* * * * *